Figure 1:
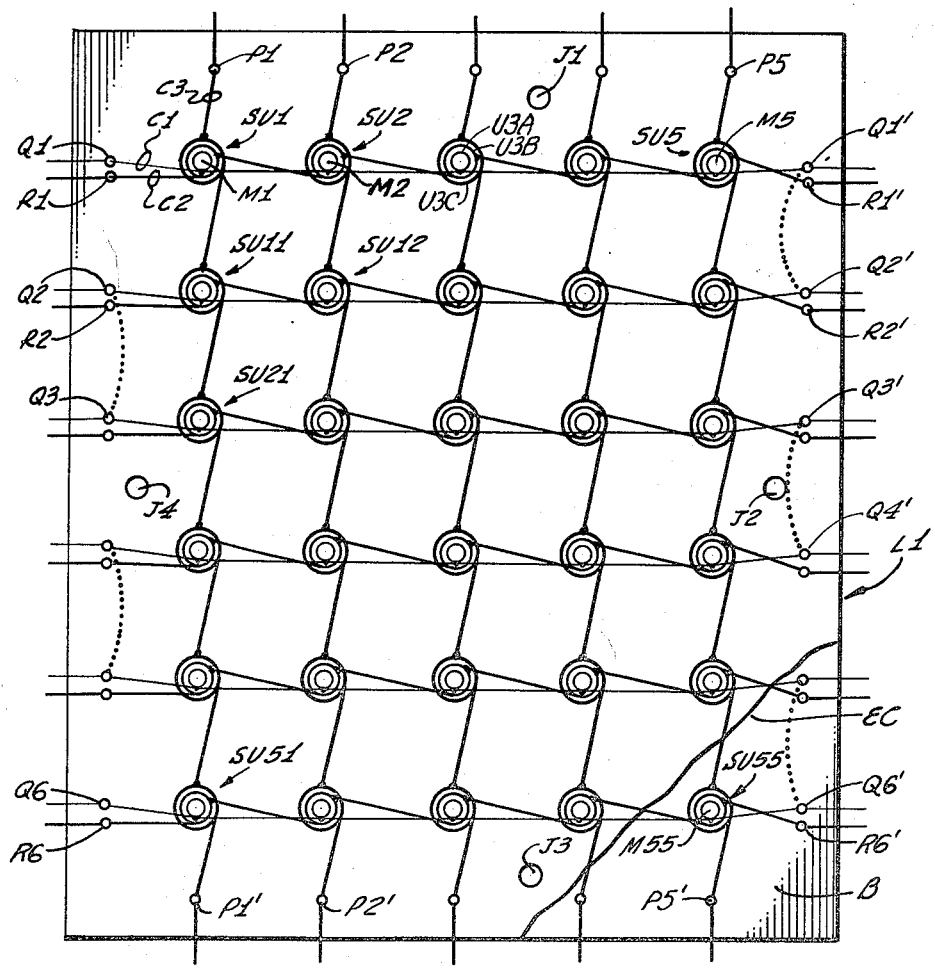

May 18, 1965  D. A. MEIER  3,184,720
SEMI-PERMANENT INFORMATION-STORE DEVICES
Filed April 6, 1960  3 Sheets-Sheet 1

INVENTOR:
Donal A. Meier
by Louis A. Kline
John J. Maslago
His Attorneys

INVENTOR:
Donal A. Meier

Louis A. Kline
John T. Marlage
His Attorneys

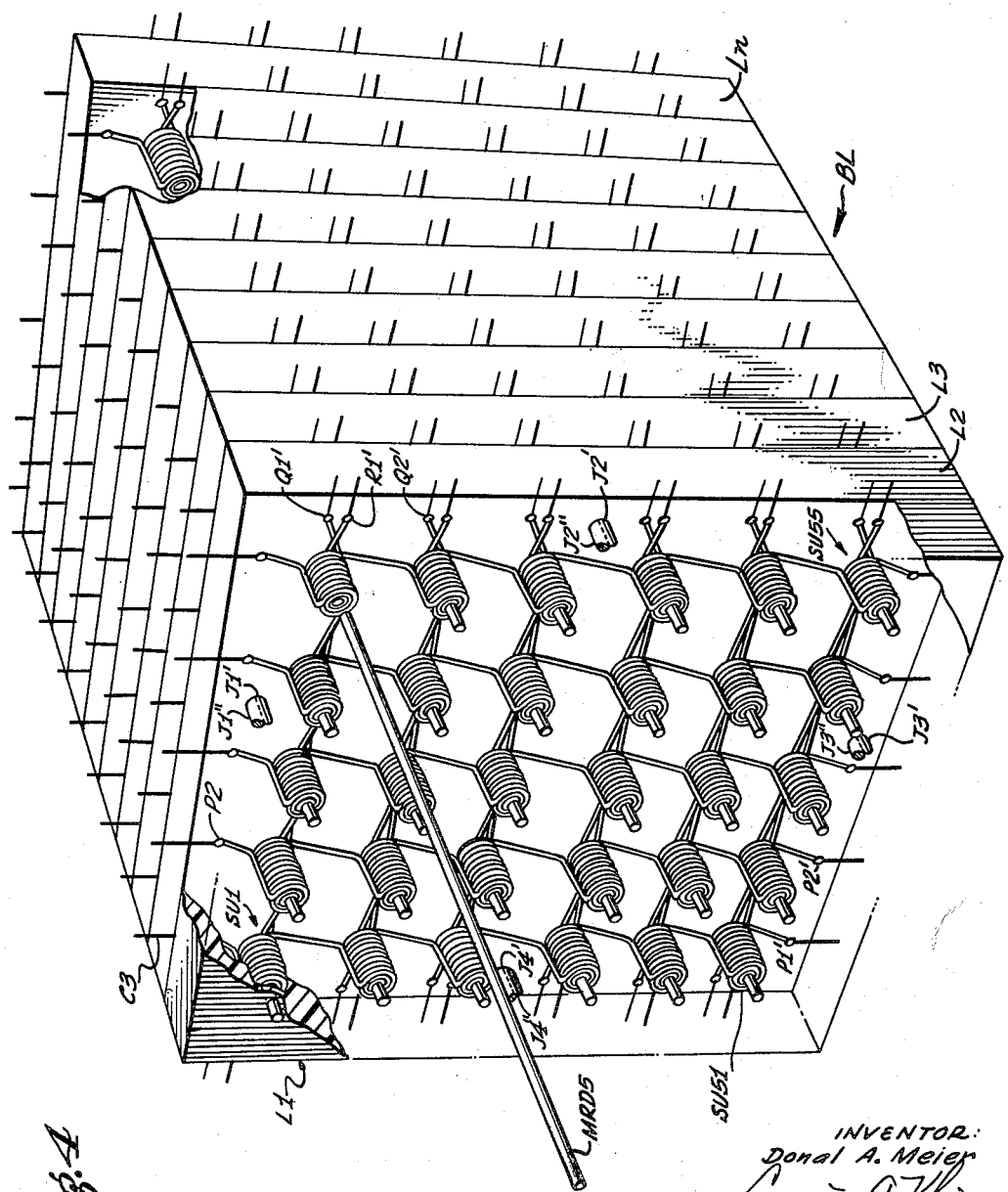

United States Patent Office 3,184,720
Patented May 18, 1965

3,184,720
SEMI-PERMANENT INFORMATION-STORE DEVICES
Donal A. Meier, Inglewood, Calif., assignor to The National Cash Register Company, Dayton, Ohio, a corporation of Maryland
Filed Apr. 6, 1960, Ser. No. 20,494
3 Claims. (Cl. 340—174)

This invention relates to arrays of solenoid coils used as components of information-store devices in information-processing systems; and more particularly to improvements in processes of producing serially-wound plural-turn solenoid-coil arrays adapted for use with removable rod-like bistable magnetic core devices of very small dimensions.

In copending U.S. patent applications of Donal A. Meier, Serial Nos. 728,739, abandoned in favor of continuation-in-part application Serial No. 795,934, filed February 27, 1959, and 796,892, now Patent Number 3,134,965, there are disclosed rod-like magnetic devices of very small diameter, and solenoid-coil means into which the magnetic devices are adapted for use to form information-store units having many unique advantages. For most efficient operation of the information-store units of the class therein generally described and comprising plural-winding plural-turns solenoid coil units, it is very desirable that the solenoid coils be closely-wound and that the several different windings or coils of the respective units be compactly formed, to reduce magnetic and electrical losses to minimum values. As indicated in the mentioned copending applications, an array of information-store units may comprise one or more sets of solenoid units each solenoid unit comprising a rod-like bistable magnetic core device and a plurality of electrically separate concentrically disposed plural-turns solenoid coils or windings closely encircling and inductively linked to the core device. Various modes of using arrays and/or sets of the units may be employed, such as modes termed "half-current select," "linear select," etc., as is well understood in the digital computer art. For that reason, there are many modes of interconnecting the separate solenoid-coils of a unit with corresponding coils of other units. While it is evident that it would be preferable to form from an integral length of conductor all those coils that are to be electrically connected in series, difficulty is experienced in doing this if the individual solenoid coils are of single-layer construction, since in that type of construction a conductor extends away from the coil at each of the coil ends making it impractical to wind a second coil over the first. Yet it is very desirable, from the standpoint of coil efficiency, to form each coil as a single layer of turns of a conductor. However, in those constructions in which the several plural-turns concentric coils of a unit were not wound as double-layer coils, the above-mentioned difficulty dictated winding each coil from a separate length of conductor, and joining the ends of the separately wound coils of the appropriate solenoid units; with the attendant disadvantages presented by soldered joints, non-uniform electrical characteristics, joint failure, etc. When it is noted that the solenoid coils under consideration are of very small dimensions, a complete solenoid coil unit comprising three concentric coils each of ten turns being considerably less than one-sixteenth of an inch in diameter and less than a sixteenth of an inch long, the difficulties presented in forming the coils and junctures is made more apparent. The present invention obviates the aforementioned difficulty while employing the same type of array of mandrel devices disclosed in the aforementioned patent applications.

Briefly, the present invention provides for forming from a single unbroken length of conductor, one or more series or sets of thus integrally connected inner coils, and from at least a second such conductor, forming at least a second series or set of integrally connected outer coils, each of the inner coils being wound on a respective mandrel and at least one of the outer coils being wound in superposed concentric relationship over one of the inner coils so as to be comprised in a respective solenoid-coil unit. In some types of solenoid-coil arrays within purview of the invention three or more individual superposed concentric coils, each formed from a different respective conductor or wire, are comprised in each of the solenoid-coil units. Generally, but not necessarily, the disposition of units of an elementary solenoid-coil array is along a straight line, with the axes of the coils perpendicular to the line and parallel each with the others. In a more extensive type of array, a unit is disposed at each intersection of a grid of intersecting lines, with the axes of the coils parallel and perpendicular to the lines of the grid and with the bases or bottom ends of the coils disposed substantially in a single plane. Such an array is herein termed a two-dimensional array. A still more extensive configuration of solenoid coils within purview of the invention is one comprising a plurality of two-dimensional arrays stacked in laminar disposition with axes of the coil units of any of the two-dimensional arrays aligned in coincidence with the similarly juxtaposed axes of coil units of the other two-dimensional arrays, whereby groups of coaxially aligned sets of coil units are provided. Such a configuration of units forms what may be termed a three-dimensional matrix of solenoid-coil units. A principal feature of the present invention relates to a two-dimensional array of solenoid-coil units and a process of producing the array, but includes application of the process to formation of the more elementary form of solenoid-coil array comprising a single row or set of coil units. In each form of the improved arrays according to the invention, the inner coil of each of a set of at least several coil units are formed from a single unbroken length of conductor, so that the several coils are integrally connected in series electrical relationship; and at least one outer coil of at least one of those units, as well as additional outer coils of units either of the same set or of other coil unit sets, are wound or formed from a second unbroken length of conductor. Thus the formation of soldered or other specially formed connections at the ends of the coils is obviated, and the only connections required are those at the two terminal ends of a series of coils. It should be understood that a series of coils formed from one conductor may include coils comprised in units only some of which may comprise coils formed from a particular second conductor. For example, in a two-dimensional array, the inner coils of all units may be formed from a single unbroken length of conductor, while a series of outer coils in one row only in one coordinate direction may be formed from a second unbroken conductor, and still another series of outer coils in a row in the transverse coordinate direction may be integrally formed from another separate unbroken conductor. Thus it is to be noted that a wide variety of configurations of series or sets of plural-turns solenoid coils are comprehended by the invention.

An additional feature of the invention is the provision of a process of producing a compact three-dimensional solenoid-coil-unit matrix comprising a plurality of two-dimensional arrays of solenoid-coil units each unit of which comprises at least two electrically-distinct substantially coaxial inner and outer plural-turns single-layer solenoid coils at least the inner one of which is integrally in electrical series relationship with other such inner coils and a length of the conductor of which such inner coil is formed is disposed longitudinally alongside that coil and within the encircling turns of the separate conductor of an outer plural-turns coil of the same coil unit.

Figure 2:
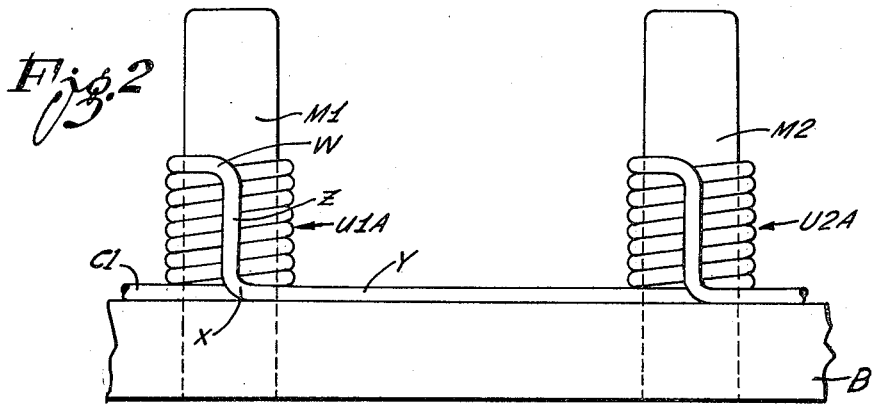
Figure 3A:
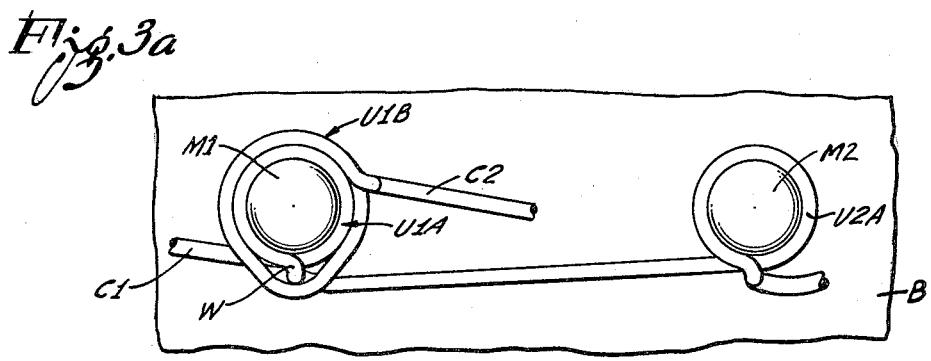
Figure 3:
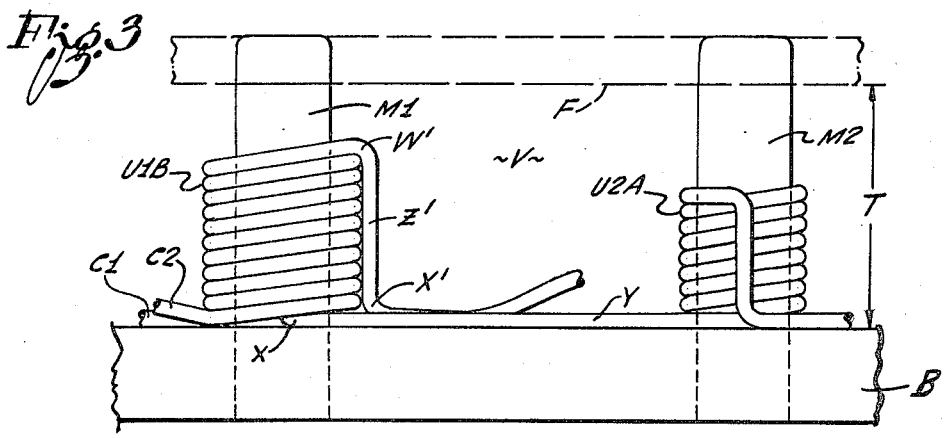

It is, then, a principal object of the present invention to provide an improved procedure or process for producing an improved solenoid-coil array. Another object of the invention is to provide improvements in a three-dimensional matrix of arrays of solenoid-coil units comprising coaxial concentrically disposed plural-turns single-layer coils. Another object of the invention is to provide improvements in arrays of multi-coil solenoid units comprising one or more series of integrally connected plural-turns single-layer solenoid coils. Other objects and advantages of the invention will be made apparent in the appended claims and in the following description of a preferred process or procedure and the accompanying drawings, in which:

FIG. 1 is an enlarged partly diagrammatic representation illustrating the serial winding of a plurality of sets of solenoid-coil units comprised in an exemplary small two-dimensional array of such units, and the terminals and appurtenant means including winding means, there being included both inner and outer plural-turns coils as well as an intermediate plural-turns coil in each of the units, and the array comprising coils wound in sets or series of single-layer coils integrally formed in series electrical relationship;

FIGS. 2, 3 and 3a are fragmentary side and top views illustrating procedural steps in the winding of solenoid coil units and the structural relationship of concentric single-layer coils of a unit; and, FIG. 4 is a view depicting a three-dimensional matrix of embedded two-dimensional arrays of solenoid-coil units produced according to the invention and the embedded arrays laminated to form a unitary structure having solenoid-coil units in each of the several arrays disposed in axial alignment with corresponding similar units of the other arrays for ready insertion of magnetic rod-like core elements, and depicting one such core element removed from the matrix.

In FIG. 1 there is indicated generally by reference characters L1 an exemplary plate-like thin block composed in part of a suitable hardened or set embedding compound EC which is in this example of transparent material but need not be, and in which compound are embedded conductors such as C1, C2 and C3, forming and connecting a plurality of solenoid-coil units such as SU1, SU2, SU11, etc., and terminal means (such as Q1, R1, P1, etc.) for the conductors. The embedding compound is preferably of a type offering good dimensional stability at higher than room temperatures and not adversely affected by aging; and the compound is preferably of a self-hardening or thermosetting synthetic resin. Acceptable exemplary compounds are those commercially marketed under the name "Aritemp No. 215" by Aries Laboratories, Inc., Long Island City, New York; and under the name "Scotchcast Resin No. 5" by Minnesota Mining and Manufacturing Company, St. Paul, Minnesota. As shown in FIG. 1, the hardened embedding compound is transparent; and a portion has been broken away at the lower right corner to show a portion of a temporary base B, and mandrel means, such as M55, upon which mandrel means the coil units are formed and held in place during placement and hardening of the embedding compound. The temporary base may be of steel, brass or other strong rigid material suitable for securely holding in parallel attitudes the several mandrels such as M5 and M55. The mandrels may be peened or otherwise securely fastened in holes formed in base B, in the particular pattern desired for the array of solenoid units. The base B is also equipped with a set of upstanding pins, such as J1, J2, J3 and J4, upon which coils the not wound but which serve to form guide holes extending through the embedding compound when the latter is solidified following completion of the coil winding and terminal forming. The mandrels, of which one is provided for each solenoid unit in an array, extend above the surface of the base B a distance somewhat in excess of the thickness T of the plate-like block in which the solenoid units are later embedded, as indicated in FIG. 3. Thus, following formation of the solenoid units and terminals, a perforated mold of box F indicated by dash lines in FIG. 3 may be disposed about base B and fitted on mandrel M to permit filling the resulting space or void V with uncured or raw embedding compound, to produce a plate-like embedment or device L1 (FIG. 1) of uniform thickness T. Following setting or hardening of the compound, the mold or box F is removed and the base with its mandrels and pins is removed from the plate L1, leaving mounting holes such as J1', J2', J3', J4' (FIG. 4), and holes extending through the interiors of the respective solenoid coil units SU1, SU2, etc., from face to face of the plate.

In the exemplary structures illustrated and in plate L1 of FIG. 1, each plate-like matrix of solenoid-coil units comprises thirty coil units, arranged in sets or series of five in one direction and six in a cross-direction. It will be understood that a plate-like matrix may comprise more or fewer coil units, that the arrays may be of other configurations, and that the number of units per set and per array may vary considerably from the exemplary numbers shown. Further, while the exemplary coil units each comprise three plural-turns single-layer independent solenoid coils, the units may each comprise any number in excess of one, of independent single-layer coils. For convenience of illustration, the outer coils are shown in FIG. 1 as of circular plan form and as being coaxial and concentric, but as will hereinafter be made evident, only the inner coil is truly circular and the outer coils, while termed concentric, are not exactly circular in form. The several coils of a unit are, however, wound about the axis of the same mandrel, and are substantially concentrically wound and substantially of the same length (number of turns), and are adapted to be inductively linked with the same short portion of a slender magnetic rod. As previously indicated, the open bores of the embedded coil units are of very small dimension, and may, for example, be of about two one-hundredths of an inch diameter. In the latter case, mandrels of that diameter are employed as the forms upon which the novel coil units are formed.

In winding the coil units, all of the innermost (inner) coils that are to be electrically in series relationship, that is, all coils of a series or set of such coils, are formed one after another from an unbroken length of wire. For example, conductor C1 (FIG. 1) is first wound upon mandrel M1, starting adjacent to base B and progressing upwardly, as indicated in FIG. 2, until the required number of turns have been wound to form a coil U1A. The conductor is then sharply bent down and formed as a short length alongside and in contact with the previously formed coil, as indicated at Z, this length of the conductor extending from the top of the coil at bend W to the bottom thereof at bend X. Then the conductor is again sharply bent, and formed into a length or portion, such as indicated at Y, extending along the surface of base B from coil U1A to the next mandrel in the series (in this case, mandrel M2). Then a portion of the conductor is similarly formed into another coil (U2A, for example), and so on, until all inner coils of the series or set have thus been similarly formed. It will be understood that the inner coils of all coils units of an array may thus be formed of a single length of wire (as in those instances wherein the inner coils are to serve as the "sense" windings of respective information-store units); or alternatively, that only one row, or other set or series of inner coils within a matrix of units, may be formed from a single conductor. Thus as illustrated in FIG. 1, the inner coils of only units SU1 through SU5 are wound from conductor C1. Following winding of a set or series of coils, the ends of the conductor, such as conductor C1, are soldered or otherwise affixed to terminals, such as terminals Q1, Q1', which are temporarily disposed upon the surface of base B. In this manner, all of the required innermost coils of an array, or of a set of arrays, are wound, using a single length of conductor for each set or series of such coils, and each coil being formed of a single layer of turns and with a length Z of the conductor disposed alongside the coil as indicated in FIG. 2.

Following completion of inner coils such as U1A and U2A, outer coils are similarly formed in encircling or "concentric" relationship with respective inner coils, as illustrated, for example, by coil U1B in FIGS. 3 and 3a; and each of these outer coils is similarly formed as a single layer of turns and with a short length, such as Z', extending alongside the coil as shown, and all those of a set or series are integrally formed from a single length of conductor such as C2. It is evident that by forming upper and lower bends such as bends W and X, and a length of conductor such as Z, lying closely alongside a coil, another single-layer coil may readily be wound upon and around any previously wound coil, and that a plurality of serially integral coils may be formed without resort to soldered or brazed connections. It also is evident that more than two "concentric" coils may be thus wound to form a solenoid-coil unit, as is diagrammatically indicated in FIG. 1 wherein each unit comprises three such concentric coils. It should be emphasized that while in FIG. 1 the set of solenoid coil units SU1, SU2 . . . SU5 comprises a set of inner coils formed from an integral conductor C1 and a set of intermediate coils formed from an integral conductor C2, such a configuration of windings is not a requirement of the invention. For example, each of the cited coil units SU1, SU2 . . . SU5 comprises a third, outermost coil, each formed from a different conductor as indicated; for example, by conductor C3 which is used to form a series or set of outermost coils comprised in the solenoid coil unit series SU1, SU11, SU21 . . . SU51. Further, as indicated by the dotted lines connecting terminals Q1'–Q2', Q2–Q3, Q3'–Q4', etc., several sets of coils may either be externally connected in series, or formed integrally as a single series-connected set from an integral conductor, all according to the number of coils in each series and the particular mechanization of electronic circuitry employed in operation of an array or matrix of solenoid units.

From the preceding description it is evident that following the winding of the several series of coils comprised in an array, and termination of the conductors on respective sets of terminals, the coils and conductors and inner terminal ends are embedded in a suitable compound which fills all the voids V between the coils, and is thus integrated into a rigid structural unit or plate such as that indicated by L1 in FIG. 1. The embedding compound permeates into the interstices between the coils of a unit and around the mandrels, and thus when the base and mandrels are removed following setting of hardening of the compound, smooth bores are formed through the respective solenoid coil units and through the compound from face to back of the plate. Thus slender magnetic rod devices, of the character disclosed in the aforementioned copending patent applications, may be inserted into respective bores for indictive cooperation with the solenoid coil units.

As indicated in FIG. 4, a plurality of the plates comprising embedded arrays, L1, L2 . . . Ln, may be stacked or laminated on assembly guide or jig rods such as J1″, J2″, J3″ and J4″, and secured into a unitary block BL (as by means of adhesive, for example), with corresponding coil-unit bores of the several plates accurately aligned in coaxial relationship and with the outer ends of the conductor terminals protruding from the block. Thus a long length of a magnetic rod-like device, such as that indicated at MRD5 in FIG. 4, may be inserted into and extend through the aligned bores of a group of solenoid coil units each of which is comprised in a respective one of the plates. As indicated, long magnetic rods are inserted, each into and through a respective group of aligned bores. As thus disposed, the coil units of a group are longitudinally spaced apart along a magnetic rod (since the thickness T of a plate is in excess of the length of a coil unit, as shown in FIG. 3); and those short sections of a rod that are disposed within respective coil units serve as active magnetic core elements, with the intervening portions of the magnetic rod being inactive. The advantages of the three-dimensional matrix of information-store units thus produced, over a three-dimensional matrix of toroidal-core type units, is apparent. The solenoid coils may be wound by hand, but preferably are wound by automatic or semiautomatic machines since the coils are very minute and the winding can be done much more rapidly by machines. To better illustrate the relationships of the windings, in FIG. 4 certain portions of the embedding compound of the plate including array L1 have been removed; and further the coils have therein been expanded somewhat, relative to the thickness T of the plate. Hence the distortion purposely introduced in FIG. 4 in the interest of clarity of illustration of an exemplary three-dimensional matrix should not be misconstrued. While all of the drawings necessarily show the elements in grossly enlarged and expanded form, it is important only that the coil unit spacing and the thickness T of the plates exceed the dimensions of the coil units sufficiently to obviate undesirable interaction between next-adjacent units. The relationship indicated in FIG. 3 is acceptable, but in some constructions it is desirable to form the plates to be of thickness twice the nominal length of the coil units, with the units spaced according to the limitations imposed by the conductor terminals. As indicated in FIG. 4, the terminals protrude from the faces of the block BL. In certain instances it may be desirable to make the plate-like devices stronger, and this may be done by using a perforated reinforcing plate mounted on the base and mandrels prior to winding the coils, and which plate is embedded with the coils. Further, in some instances, a magnetic rod having a series of solenoids integrally wound thereon may be used.

Thus it is seen that the invention provides a mode of producing an array of solenoid-coil units in which the units are each composed of a plurality of separate plural-turns single-layer coils and in which corresponding coils of all of a set of coil units are integral and formed of a continuous portion of conductor, whereby like sets or series of corresponding coils have substantially identical electrical characteristics and whereby the disadvantages of separate serial connection of a plurality of coils is obviated.

While herein the terms "conductor" and "single conductor" have been applied to a single integral wire from which a coil is wound or formed, and the respective conductors depicted in the drawings are single wires, the terms used are equally applicable to stranded, braided or parallel-laid multiple-wire conductors which may as a group be formed into turns as would a single wire. For example, an inner coil may be formed as a single layer of turns of a conductor formed of a plurality of parallelly-disposed side-by-side wires each serving to carry a respective part of current load of the coil. Further, other shapes of wire than the round shape depicted in the drawings, may be used; for example, wire of flat or square cross-section. The number of turns of conductor per coil varies according to wire shape, currents used, etc.

Exemplary arrays and an exemplary three-dimensional matrix of solenoid coil units according to the invention having been disclosed in detail together with the procedure for producing them, it is evident that modifications thereof will occur to those skilled in the art. Accordingly it is not desired that the invention be limited to the specific

What is claimed is:

1. A three-dimensional information-store solenoidal-coil rod matrix comprising in combination: a plurality of substantially similar plates, each plate comprising a two-dimensional array of spaced-apart solenoidal-coil units and a hardened thermosetting synthetic resin in which said solenoid coil units are embedded, each solenoid-coil unit being comprised of at least first and second single layer plural-turns solenoidal coils wound one over the other around a respective perpendicular bore provided in the plate, means cooperating with guide holes provided in the hardened resin of each plate for securing the plates together in aligned fashion with each solenoid-coil unit in each plate having its respective bore aligned with the bores of correspondingly positioned solenoid-coil units in the other plates, the thickness of each plate being chosen so that correspondingly positioned solenoid-coil units in adjacent plates are spaced apart from one another, and a plurality of slender magnetic rod devices inserted into the aligned bores so as to pass through respectively positioned solenoid-coil units for inductive cooperation therewith, the solenoid-coil units in each two-dimensional array being arranged in a plurality of rows and columns, the first coils of solenoidal-coil units in the same row being connected in series and the second coils of solenoid-coil units in the same column being connected in series, the first coils and the series connections therebetween provided in each row all being integrally formed of a single length of a conductor, and the second coils and the series connections therebetween provided in each column all being integrally formed of a single length of a conductor, the manner in which the first and second coils are wound on each solenoid unit being such that the conductor forming the innermost coil is received at a predetermined bottom level and progresses upwardly to a predetermined upper level to form a single layer plural-turns coil, the conductor at the top of the innermost coil being sharply bent down to said bottom level with the conductor in contact with the turns of the innermost coil, the short length of bent down conductor so formed being approximately perpendicular to the plate and after reaching said bottom level being again sharply bent so as to run approximately parallel to the plate to the next solenoid-coil unit where it is formed into the next in line innermost coil in the same manner, the outermost coil of each solenoid-coil unit being wound over both the innermost coil and its perpendicular short length of bent down conductor.

2. The invention in accordance with claim 1 wherein the outermost coils and the connections therebetween are formed in the same manner as for the innermost coils.

3. The invention in accordance with claim 2, wherein each solenoid-coil unit is provided with a third single-layer plural-turns coil wound over the outermost coil and its associated bent down conductor, and wherein predetermined ones of these third coils on each array are formed and connected in series using the same integral conductor.

References Cited by the Examiner

UNITED STATES PATENTS

| | | | |
|---|---|---|---|
| 2,671,950 | 3/54 | Sukacev | 29—155.5 |
| 2,776,419 | 1/57 | Rajchman et al. | 340—174 |
| 2,877,540 | 3/59 | Austen | 29—155.5 |
| 2,878,463 | 3/59 | Austen | 340—174 |
| 2,882,519 | 4/59 | Wallentine | 340—174 |
| 3,051,930 | 8/62 | Austen | 340—174 |

OTHER REFERENCES

Publication I, The Bell System Technical Journal, vol. 36, No. 6, pages 1319 to 1340, November 1957.

IRVING L. SRAGOW, *Primary Examiner.*

EVERETT R. REYNOLDS, *Examiner.*